US008831599B2

(12) United States Patent
Kuru et al.

(10) Patent No.: US 8,831,599 B2
(45) Date of Patent: Sep. 9, 2014

(54) AVOIDING PING-PONG HANDOVERS (75) Inventors: Lauri Kuru, Espoo (FI); Petri Jolma, Nurmijarvi (FI); Zexian Li, Espoo (FI); Jarmo Makinen, Espoo (FI); Roman Pichna, Espoo (FI)

(73) Assignee: Nokia Corporation, Espoo (FI)

( * ) Notice: Subject to any disclaimer, the term of this patent is extended or adjusted under 35 U.S.C. 154(b) by 1163 days.

(21) Appl. No.: 12/159,581

(22) PCT Filed: Jun. 29, 2007

(86) PCT No.: PCT/IB2007/052535
§ 371 (c)(1),
(2), (4) Date: Sep. 7, 2010

(87) PCT Pub. No.: WO2009/004405
PCT Pub. Date: Jan. 8, 2009

(65) Prior Publication Data
US 2012/0178450 A1    Jul. 12, 2012

(51) Int. Cl.
H04W 40/00    (2009.01)
H04W 36/00    (2009.01)
H04W 36/08    (2009.01)
H04W 36/24    (2009.01)

(52) U.S. Cl.
CPC ............ H04W 36/08 (2013.01); H04W 36/245 (2013.01)
USPC ........... 455/428; 455/436; 455/440; 455/444; 370/331

(58) Field of Classification Search
CPC .............. H04W 84/06; H04B 7/18539; H04B 7/18541

USPC ................... 455/428, 436, 440, 444; 370/331
See application file for complete search history.

(56) References Cited

U.S. PATENT DOCUMENTS

| 5,623,535 | A | * | 4/1997 | Leung et al. | 455/444 |
| 5,822,696 | A | * | 10/1998 | Bergkvist | 455/436 |
| 5,862,478 | A | * | 1/1999 | Cutler et al. | 455/428 |
| 6,681,112 | B1 | * | 1/2004 | Schwarz et al. | 455/436 |
| 6,711,408 | B1 | * | 3/2004 | Raith | 455/440 |
| 7,161,914 | B2 | * | 1/2007 | Shoaib et al. | 370/331 |
| 2004/0121770 | A1 | * | 6/2004 | Tigerstedt et al. | 455/436 |

FOREIGN PATENT DOCUMENTS

WO    WO 99/57933    11/1999

OTHER PUBLICATIONS

Pollini, G.P. "Trends in Handover Design", IEEE Communications Magazine, IEEE Service Center, New York, NY vol. 34, No. 3, Mar. 1, 1996, pp. 82-90.

* cited by examiner

*Primary Examiner* — William D Cumming
(74) *Attorney, Agent, or Firm* — Harrington & Smith (57) ABSTRACT

The present invention provides a method and respective entities for avoiding handovers in a ping-pong manner in a communication network. The method comprises comparing, when a handover of a mobile station to a base station is intended, decision criteria of the intended handover with decision criteria of previous handovers of the mobile station to that base station, and deciding on allowing or preventing the intended handover based on the result of the comparison.

31 Claims, 5 Drawing Sheets

AVOIDING PING-PONG HANDOVERS

FIELD OF THE INVENTION

The present invention relates to the field of communication, and in particular to radio resource management or handover management in a mobile communication network.

If a mobile station moves within a certain area that is served by different base stations, handovers between the respective base stations have to be performed in order to assure that the mobile station can communicate within the whole area of the communication network. In this case, the mobile station receives a signal from it's serving base station and signals from at least one potential target base station for the handover. When the received signals have approximately an equal quality (e.g. a received signal strength or a C/I (carrier-to-interference-ratio) have the same order of magnitude), there may occur a problem that handovers are performed frequently back and forth between the two (or even more) base stations in a ping-pong manner. As a consequence, there may be experienced problems such as continuous small breaks in the user plane signal (voice or data), poor user experience, large control signalling overhead or poor spectral efficiency.

One of the root causes for frequent handovers between base stations may be that the base station and the mobile station use different decision criteria, i.e. metrics. The metrics may be different if the base station and the mobile station measure different parameters for the purpose of deciding about a handover. For example, the base station could measure the received signal strength whereas the mobile station measures the C/I, or vice versa. Further, the metrics are independent from each other when the uplink and downlink are independent, like e.g. in the case of frequency division duplex (FDD).

As examples for the metrics to be measured, in general a base station (or another entity in the network) can use the following information (or combinations of these) for handover decisions. The mobile station however has only a subset of these available. These metrics i.e. information are, e.g. relative RSSI (received signal strength indicator), SNR (signal-to-noise-ratio), C/I, BER (bit error rate), loosing link (absolute RSSI), relative delay, round-trip-delay, loosing bandwidth (for application, QoS (quality of service), RRM (radio resource management), transport optimization, or underlay-overlay-optimization, etc.

A further root cause for frequent handovers between base stations may be that the base station and the mobile station use the same metrics but have different estimates thereof. This may be because the interference may be different at different ends of the link or because the channels are independent like e.g. in the case of frequency division duplex. Another reason is that the estimation of an unknown variable always includes an estimation error.

Furthermore, a root cause may be that the metrics and estimates are the same, but the base station and the mobile station draw different conclusions thereof. This may happen, e.g. when decision thresholds in the base station and the mobile station are set differently. Such a possibility may also exist between two base stations which may draw conclusions differently.

A further root cause may be channel dynamics. That is, fast fading may cause a reason for ping-pong handover, even if the estimates were the same and correct. However, by definition fading is fast in this case which means that this case could be considered equivalent to the above mentioned case of an estimation error, since accurate estimation usually requires some filtering, i.e. averaging over time.

In general, when referring to a handover in a mobile communication network, there has to be distinguished between two cases. In a first case, the mobile station does not have the capability to directly initiate a handover (e.g. in 2G and 3G networks). Here, the network has a centralized element which decides about all handovers and the mobile station has no capability to initiate a handover process.

In a second case, the mobile station, has this capability of initiating a handover, that is, a network element as well as the mobile station can initiate a handover. By adding such a capability to initiate handovers to mobile stations, there has been made an attempt to solve spectrum efficiency problems related to messaging/reporting overheads. This reduces the need to report measurement results to the base station. However, in such a case, there might appear a problem that the mobile station and the base station disagree about the best serving base station. Without any control, this might lead to frequent handovers back and forth between two or more base stations in a ping-pong manner.

In the above described first case, only a subset of the root causes as discussed above are valid. In the above described second case, when the mobile station has the capability to initiate a handover, all root causes as listed above are possible.

SUMMARY

The present invention provides a method and respective devices that are able to detect the risk of ping-pong situations and to prevent consecutive ping-pong handovers between two or more base stations in a communication network.

According to the present invention, when unnecessary handovers are avoided, network resources and spectrum resources can be saved and user experience can be prevented form being degraded.

According to an aspect of the present invention there is provided a method comprising: comparing, when a handover of a mobile station to a base station is intended, decision criteria of the intended handover with decision criteria of previous handovers of the mobile station to that base station; and deciding on allowing or preventing the intended handover based on the result of the comparison.

According to further refinements of the invention as defined under the above aspects, the method further comprises:

comparing a time interval from an end of a last attachment of the mobile station to the base station to an actual time point of the intended handover, with a predetermined time interval; and deciding on carrying out the comparison of the decision criteria based on the result of the comparison of the time intervals;

storing identifications of at least one base station to which the mobile station had previously been attached; storing a time interval from an end of the last attachment of the mobile station to the at least one base station whose identification is stored, for each of the at least one base stations; storing decision criteria for a handover of the mobile station to the at least one base station, for each of the at least one base stations; determining an identification of a base station, to which a handover is intended, and decision criteria of the intended handover; comparing the identification of the base station, to which a handover is intended, and the stored identifications, and deciding whether to allow or to prevent the handover based on a result of the comparison of the time interval and the identification;

if the identification of the base station, to which a handover is intended, is not stored, allowing the intended handover;

if the identification of the base station, to which a handover is intended, is stored, and if the time interval has expired, allowing the intended handover;

if the identification of the base station, to which a handover is intended, is stored, if the time interval has not expired and if the decision criteria for the intended handover are not stored, allowing the intended handover;

if the identification of the base station, to which a handover is intended, is stored, if the time interval has not expired and if the decision criteria for the intended handover are stored, comparing the decision criteria for the intended handover with a predetermined threshold value;

storing identifications of at least one mobile station which had previously been attached to the base station; storing a timer interval from an end of a last attachment of the at least one mobile station, whose identification is stored, to the base station, for each of the at least one mobile stations; storing decision criteria for a handover of the at least one mobile station, for each of the at least one mobile stations; determining an identification of a mobile station for which a handover to the base station is intended, and decision criteria of the intended handover; comparing the identification of the mobile station for which the handover to the base station is intended and the stored identifications, and deciding whether to allow or to prevent the intended handover based on a result of the comparison of the time interval and the identification;

if the identification of the mobile station for which the handover to the base station is intended is not stored, allowing the intended handover;

if the identification of the mobile station for which the handover to the base station is intended is stored, and if the time interval has expired, allowing the intended handover;

if the identification of the mobile station for which the handover to the base station is intended is stored, if the time interval has not expired and if the decision criteria for the intended handover are not stored, allowing the intended handover;

if the identification of the mobile station for which the handover to the base station is intended is stored, if the time interval has not expired and if the decision criteria for the intended handover are stored, comparing the decision criteria for the intended handover with a predetermined threshold value;

if the decision criteria for the intended handover exceed the predetermined threshold value, allowing the intended handover;

if the decision criteria for the intended handover do not exceed the predetermined threshold value, preventing the intended handover.

According to another aspect of the present invention there is provided a device comprising: a comparing unit configured to compare, when a handover of a mobile station to a base station is intended, decision criteria of the intended handover with decision criteria of previous handovers of the mobile station to that base station; and a deciding unit configured to decide on allowing or preventing the intended handover based on the result of the comparison.

According to further refinements of the invention as defined under the above aspects, the device further comprises: the comparing unit being further configured to compare a time interval from an end of a last attachment of the mobile station to the base station to an actual time point of the intended handover, with a predetermined time interval; and the deciding unit being further configured to decide on carrying out the comparison of the decision criteria based on the result of the comparison of the time intervals;

a storing unit configured to store identifications of at least one base station to which the mobile station had previously been attached; the storing unit being further configured to store a time interval from an end of the last attachment of the mobile station to the at least one base station whose identification is stored, for each of the at least one base stations; the storing unit being further configured to store decision criteria for a handover of the mobile station to the at least one base station, for each of the at least one base stations; a determining unit configured to determine an identification of a base station, to which a handover is intended, and decision criteria of the intended handover; the comparing unit being further configured to compare the identification of the base station, to which a handover is intended, and the identifications stored, and the deciding unit being further configured to decide whether to allow or to prevent the handover based on a result of the comparison of the time interval and the identification;

if the identification of the base station, to which a handover is intended, is not stored, the deciding unit being configured to decide to allow the intended handover;

if the identification of the base station, to which a handover is intended, is stored, and if the time interval has expired, the deciding unit being configured to decide to allow the intended handover;

if the identification of the base station, to which a handover is intended, is stored, if the time interval has not expired and if the decision criteria for the intended handover are not stored, the deciding unit being configured to decide to allow the intended handover;

if the identification of the base station, to which a handover is intended, is stored, if the time interval has not expired and if the decision criteria for the intended handover are stored, the comparing unit being further configured to compare the decision criteria for the intended handover with a predetermined threshold value;

a storing unit configured to store identifications of at least one mobile station which had previously been attached to the base station; the storing unit being further configured to store a timer interval from an end of a last attachment of the at least one mobile station, whose identification is stored, to the base station, for each of the at least one mobile stations; the storing unit being further configured to store decision criteria for a handover of the at least one mobile station, to the base station, for each of the at least one mobile stations; a determining unit configured to determine an identification of a mobile station for which a handover to the base station is intended, and decision criteria of the intended handover; a comparing unit configured to compare the identification of the mobile station for which the handover to the base station is intended and the identifications stored, and a deciding unit configured to decide whether to allow or to prevent the intended handover based on a result of the comparison of the time interval and the identification;

if the identification of the mobile station for which the handover to the base station is intended is not stored, the deciding unit being configured to allow the intended handover;

if the identification of the mobile station for which the handover to the base station is intended is stored, and if the time interval has expired, the deciding unit being configured to allow the intended handover;

if the identification of the mobile station for which the handover to the base station is intended is stored, if the time interval has not expired and if the decision criteria for the intended handover are not stored, the deciding unit being configured to allow the intended handover;

if the identification of the mobile station for which the handover to the base station is intended is stored if the time interval has not expired and if the decision criteria for the intended handover are stored, the comparing unit being configured to compare the decision criteria for the intended handover with a predetermined threshold value;

if the decision criteria for the intended handover exceed the predetermined threshold value, the deciding unit being configured to allow the intended handover; and if the decision criteria for the intended handover do not exceed the predetermined threshold value, preventing the intended handover.

According to a further aspect of the present invention there is provided a system comprising a device as defined above.

According to a further aspect of the present invention there is provided a computer program product including a program comprising software code portions, that is, computer program code, for performing, when the program is run on a processing device, any of the steps of the methods as defined above.

According to a further aspect of the present invention there is provided a computer readable medium storing a computer program product as defined above.

According to a further aspect of the present invention there is provided a module including means for performing any of the steps of the methods as defined above.

BRIEF DESCRIPTION OF THE DRAWINGS

The present invention is described herein below with reference to the accompanying drawings, wherein.

DETAILED DESCRIPTION OF EMBODIMENTS OF THE INVENTION

The present invention will be described herein below with reference to the accompanying drawings.

Figure 1:
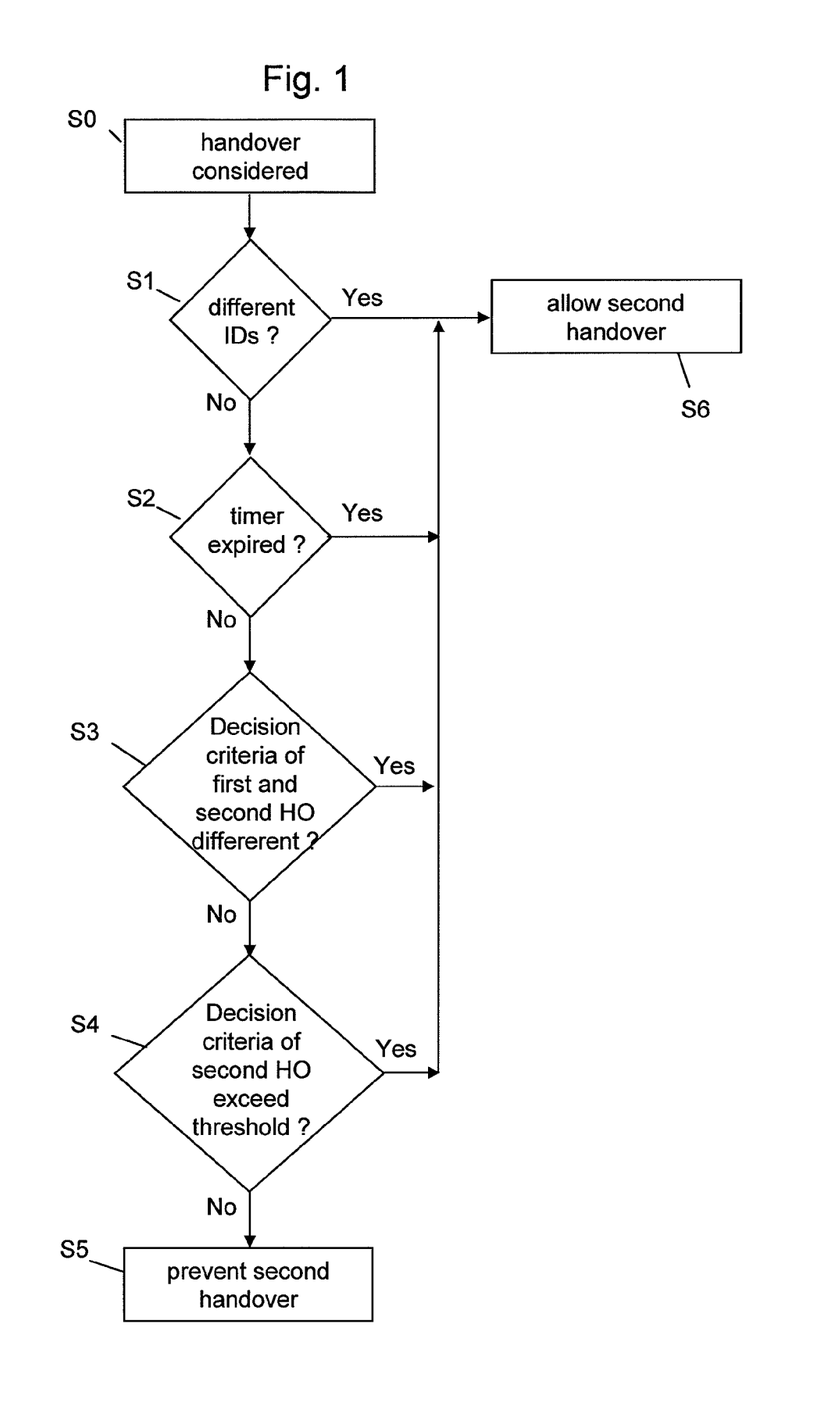
FIG. 1 is a flowchart illustrating a process for making a decision on whether to perform or to prevent a handover according to embodiments of the present invention.

FIG. 1 is a flowchart illustrating a process for making a decision on whether to perform or to prevent a handover according to embodiments of the present invention.

A ping-pong handover detection method according to embodiments of the present invention as shown in FIG. 1 is based on timers and handover reasons. According to the method shown in FIG. 1, the handover is initiated by the mobile station. Here, it is assumed that the mobile station was attached to a first base station. The mobile station stores identifications of base stations that have served the mobile station lately. Then, a handover of the mobile station to another base station is performed. At the time of the end of the attachment of the mobile station to the first base station, a timer with respect to the first base station is started, which identification is stored in the mobile station. Now, the mobile station is not allowed to return to the same, i.e. first base station as long as the timer is running if the decision criteria (i.e. the metrics) for the second handover to the first base station are the same as for the first handover to the first base station and the decision criteria do not exceed a given threshold value.

According to FIG. 1, if it is considered to perform a handover at step S0, it is checked at step S1 if the identification of a target base station is stored in the mobile station, for example, in a list of the identifications of the base stations that have served the mobile station lately. If the identification of the target base station is not stored, the second handover is allowed at step S6. If the identification of the base station is stored, i.e. if the target base station is, for example, the first base station, at step S2 it is checked whether the timer, which has been started for the first base station at the end of the last attachment to the first base station, is still running. If it is determined at step S2 that the timer has expired, the process will proceed to step S6 and the second handover to the target base station will be allowed. Otherwise, if the timer is still running, it is checked at step S3 whether the decision criteria for the second handover (HO), i.e. the metrics, are the same as for one of the earlier handover(s) to the first base station for which the timer is still running. Therefore, the mobile station stores the decision criteria for handovers to each base station and the mobile station checks whether the decision criteria for the handover to the target base station are stored.

Alternatively, instead of using a running timer, an actual point of time of an last attachment to a base station could be stored. Then, at step S2, the point of time of the last attachment and the point of the time of the request for the second handover could be compared in order to check whether the time interval therebetween exceeds a predetermined threshold.

If it is determined that the same decision criteria have not been stored, the handover to the target base station will be allowed at step S6. However, if the same decision criteria have been stored, i.e. the decision criteria are the same as for the previous handover to this base station, it is checked at step S4 whether the decision criteria exceed the hard limit, i.e. a predetermined threshold value. A hard limit means that within the timer, the threshold for the decision criteria, i.e. the metrics, for a handover is harder than for the first handover. The threshold is set to such an extent that, e.g. the connection will be lost or the quality reaches a level of effective unusability if the handover is prevented. If it is determined that the decision criteria do not exceed the hard limits, the handover will be prevented at step S5 and the timer will continue running until it expires. On the other hand, when the decision criteria exceed the hard limits, i.e. when the connection is going to break if the handover is not allowed, the handover will be permitted in step S6.

After the timer has expired, it is not necessary to store the handover history information and therefore, it can be deleted.

In the above description, it has been assumed that the handover is initiated by the mobile station. However, the handover can also be initiated by another network element. Such a case will later be described in more detail with respect to FIG. 3.

It is to be noted that all processing steps that have been described in the foregoing can also be implemented using computer-readable signals that may be stored on a computer-readable medium and carry instructions to be executed by one of the devices.

Figure 2:
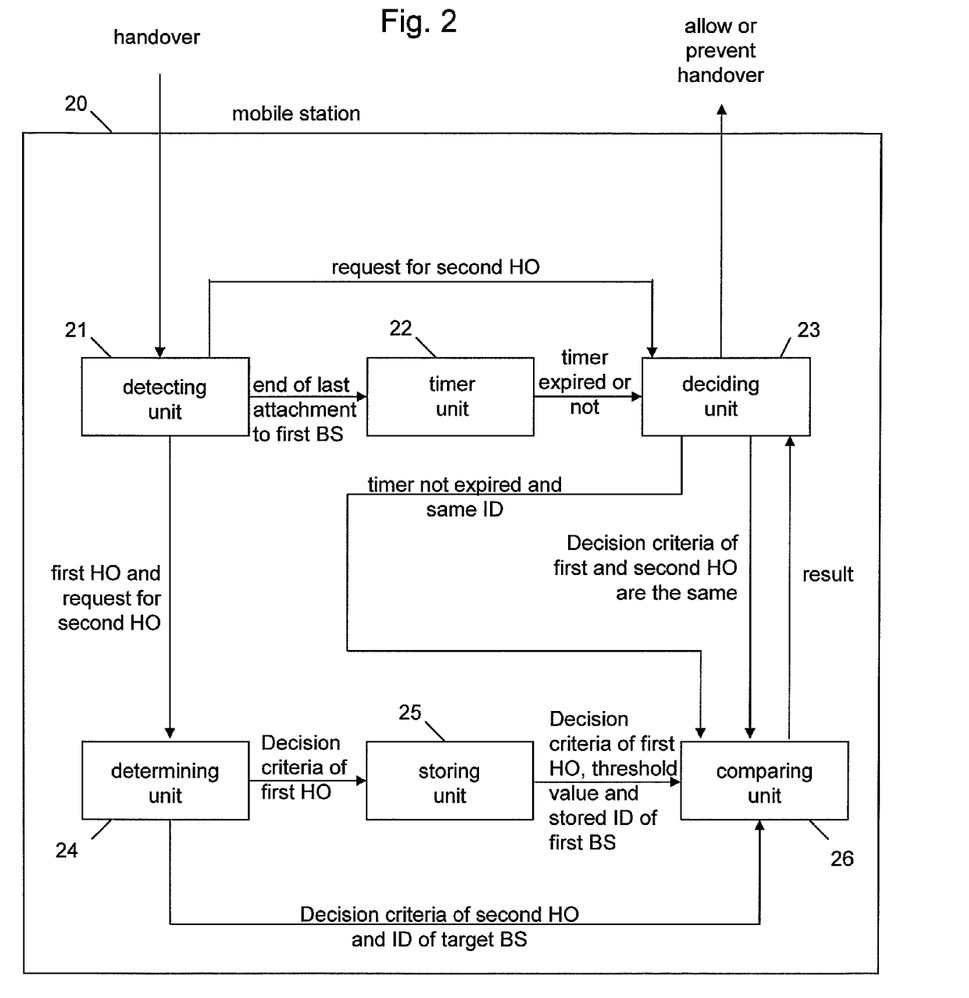
FIG. 2 is a block diagram showing a mobile station according to embodiments of the present invention.

FIG. 2 is a block diagram showing a mobile station according to embodiments of the present invention.

As shown in FIG. 2, the mobile station 20 comprises a detecting unit 21 which has detected a first handover (HO) of the mobile station (MS) to a first base station (BS). At the time of the end of the last attachment to the first base station, a timer is started by a timer unit 22 connected to the detecting unit 21. Further, the mobile station comprises a storing unit 25 which stores identifications of base stations that have served the mobile station lately. Additionally, the storing unit 25 stores decision criteria for handovers to the base stations, whose identifications are stored, for each base station.

Then, if after a handover of the mobile station to another base station, the detecting unit 21 detects a request for a handover of the mobile station to a target base station (hereinafter referred to as a second handover), a determining unit 24 determines an identification of the target base station and forwards this identification to a comparing unit 26. The comparing unit 26 checks whether the identification of the target base station is stored in the storing unit 25. If the identification of the target base station is not stored in the storing unit 25, the deciding unit 23 is informed about this result and allows the second handover. If the check results that the identification of the target base station is stored, the deciding unit 23 is informed accordingly and the deciding unit 23 checks whether the timer for the base station corresponding to the identification has expired or not. If the timer has expired, the deciding unit 23 allows the second handover. If the timer has not expired, the handover is prevented and the deciding unit 23 informs the comparing unit thereof.

Then, the comparing unit 26 checks whether the decision criteria of the second handover received from the determining unit 24 are stored in the storing unit 25. The deciding unit 23 is informed about the result of this check. If the same decision criteria have not been stored, the deciding unit 23 allows the second handover. However, if the same decision criteria have been stored, the second handover is prevented and the comparing unit 26 is informed accordingly. Thereafter, the comparing unit 26 checks whether the decision criteria of the second handover exceed a predetermined threshold stored in the storing unit 25. The deciding unit 23 is informed about the result of this check. If the predetermined threshold is exceeded, the deciding unit 23 allows the second handover. Otherwise, the second handover is finally prevented.

Figure 3:
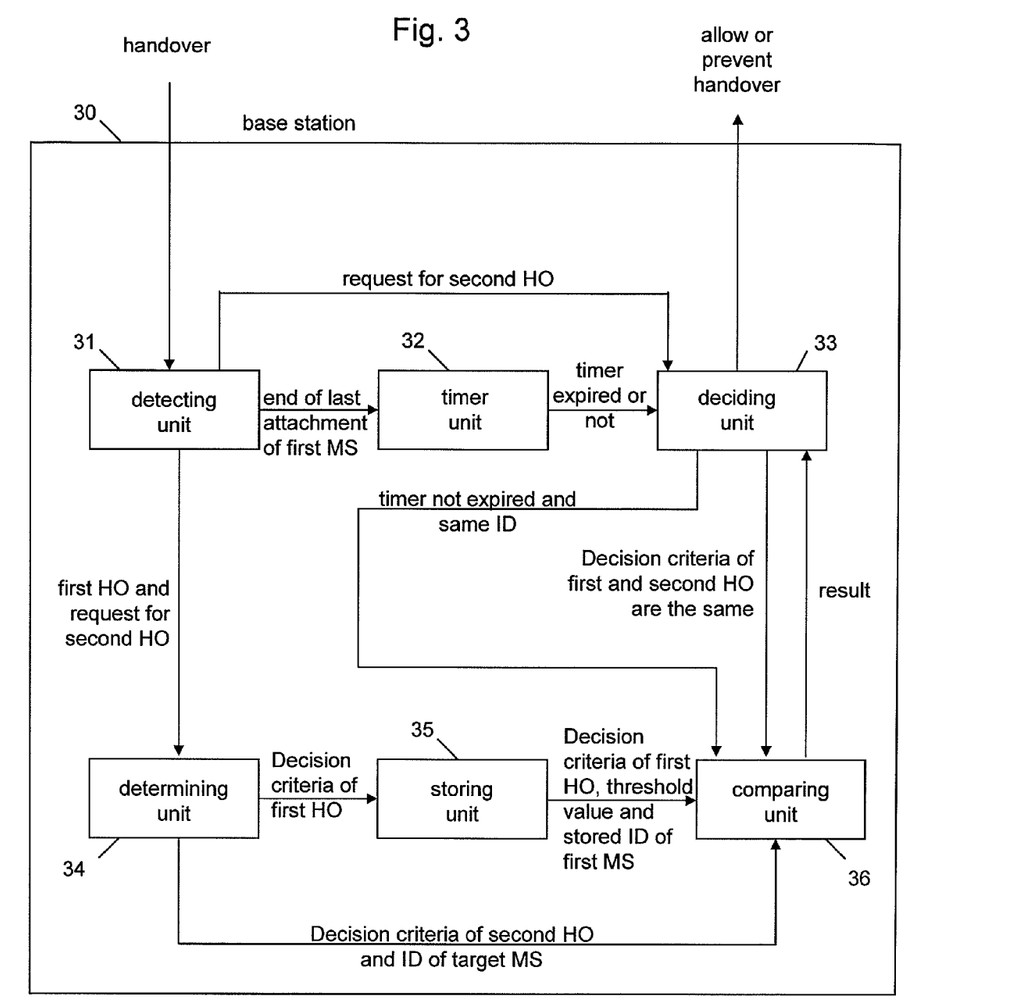
FIG. 3 is a block diagram showing a base station according to embodiments of the present invention.

FIG. 3 is a block diagram showing a base station according to embodiments of the present invention.

As shown in FIG. 3, the base station (BS) 30 as an example of a network element, comprises a detecting unit 31 which has detected a first handover (HO) of a first mobile station (MS) to the base station 30. At the time of the end of a last attachment of the first mobile station to the base station, a timer is started by a timer unit 32 connected to the detecting unit 31. Further, the base station comprises a storing unit 35 which stores identifications of mobile stations that have been attached to the base station lately. Additionally, the storing unit 35 stores decision criteria for handovers of the mobile stations whose identifications are stored, to the base station, for each mobile station.

Then, if after a handover of the first mobile station to another base station, the detecting unit 31 detects a request for a handover of a second mobile station to the base station (hereinafter referred to as a second handover), a determining unit 34 determines an identification of the second mobile station and forwards this identification to a comparing unit 36. The comparing unit 36 checks whether the identification of the second mobile station is stored in the storing unit 35. If the identification of the second mobile station is not stored, the deciding unit 33 is informed about this result and the deciding unit 33 allows the second handover. If the check results that the identification of the second mobile station is stored, the deciding unit 33 is informed accordingly and the deciding unit 33 checks whether the timer for the mobile station corresponding to the identification has expired or not. If the timer has expired, the deciding unit 33 allows the second handover. If the timer has not expired, the handover is prevented and the deciding unit 33 informs the comparing unit 36 thereof.

Then, the comparing unit 36 checks whether the decision criteria for the second handover received from the determining unit 34 are stored in the storing unit 35. The deciding unit 33 is informed about the result of this check. If the same decision criteria for the second handover have not been stored, the deciding unit 33 allows the second handover. However, if the same decision criteria have been stored, the second handover is prevented and the comparing unit 36 is informed accordingly. Thereafter, the comparing unit 36 checks whether the decision criteria of the second handover exceed a predetermined threshold stored in the storing unit 35. The deciding unit 33 is informed about the result of this check. If the predetermined threshold is exceeded, the deciding unit 33 allows the second handover. Otherwise, the second handover is finally prevented.

In the foregoing description of the network element, a base station has been used as an example for the network element. However, the network element does not necessarily have to be a base station but can also be any other network element. In such a case, the network element may not only store the identifications of the mobile stations, but also identifications of the base stations that are associated with each identification of the mobile stations.

In the foregoing description of the base station and the mobile station, only the units that are relevant for understanding the principles of the invention have been described using functional blocks. The base station and the mobile station may comprise further units that are necessary for their operation as base station and mobile station, respectively. However, a description of these units is omitted in this specification. The arrangement of the functional blocks of the devices is not construed to limit the invention, and the functions may be performed by one block or further split into sub-blocks.

One possible solution is that the handover back to the earlier base station is prevented, as described above. This is possible when the network has a centralized handover control and may also be possible when the handover control is distributed (around the network or between the network and the mobile station).

A further possibility is that the handover of the mobile station is performed back and forth once. This is also possible with distributed handover control since each base station must track only it's own history.

As the embodiments of the present invention have been described above in more general terms, a specific example will be given with respect to WiMAX (Worldwide Interoperability for Microwave Access). However, it is to be noted that this is only a special example and that the present invention is not to be limited to WiMAX.

According to WiMAX, a mobile station can request a handover and it may provide the following information about each candidate target base station: (physical) C/I, RSSI, relative delay and base station round-trip-delay. The WiMAX network elements may then derive the actual handover criteria from the information provided by the mobile station. The handover decision should be based on a comparison of one or more of the metrics.

Figure 4:
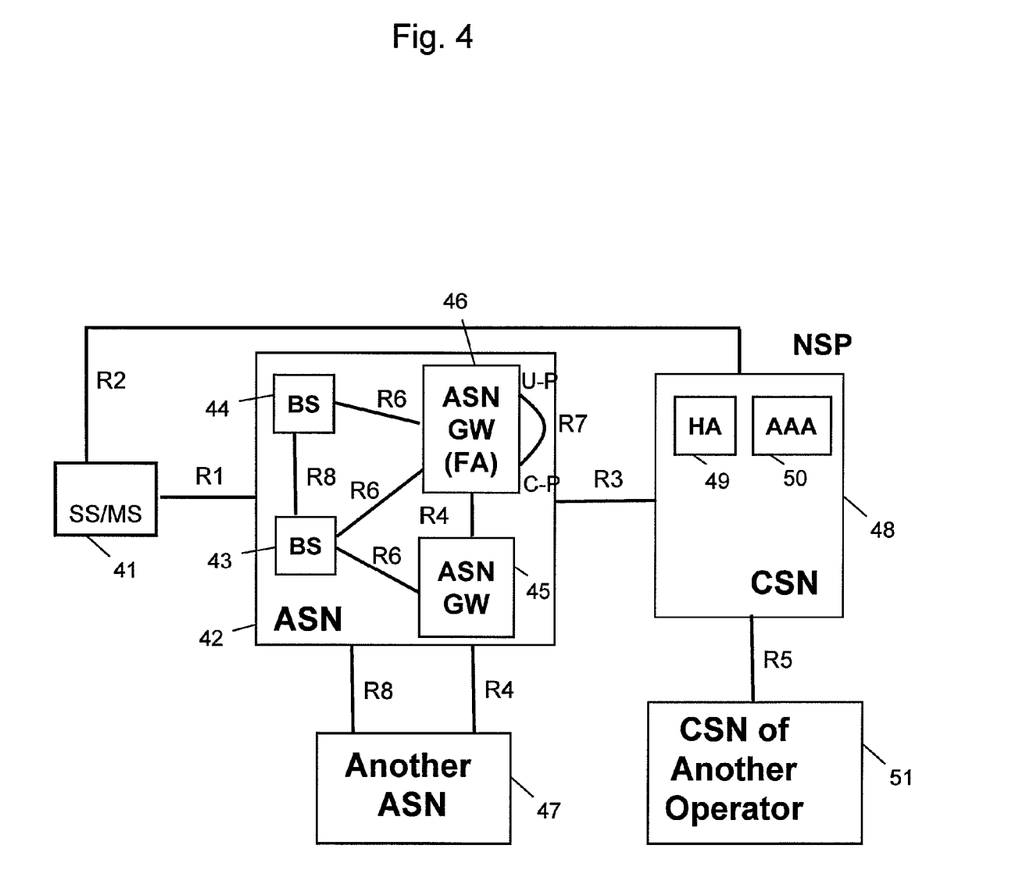
FIG. 4 shows an example of a WiMAX architecture to which the present invention may be applied.

FIG. 4 shows an example of a WiMAX architecture to which the above features and embodiments of the invention may be applied. A mobile station MS or SS 41 may communicate with an access service network ASN 42 via an interface R1. The access service network 42 may include one or more base stations BS 43, 44 and one or more access service network gateways ASN-GWs 45, 46, e.g. gateway 46, which may contain foreign agent FA functionality. The access service network ASN 42 may communicate with another access service network 47 via interfaces R4, R8, and with a connectivity service network CSN 48 of a network service provider NSP via interface R3. The connectivity service network CSN 48 of the network service provider NSP further includes a home agent HA 49 and a function, module, device for authentication, authorization and accounting, AAA 50. The connectivity service network CSN 48 of a network service provider NSP may communicate with another connectivity service network CSN 51 of another operator via interface R5.

Figure 5:
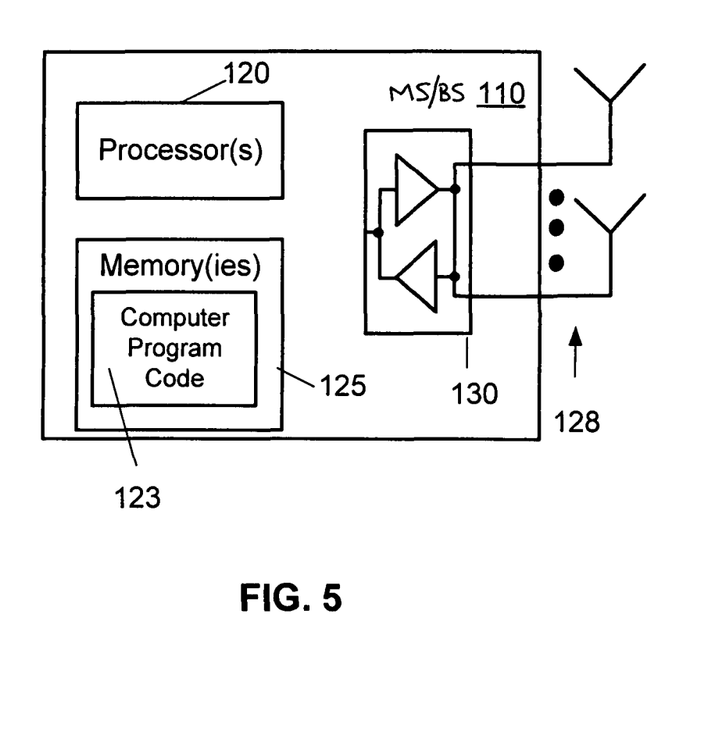
FIG. 5 is a schematic diagram of a mobile station or base station which may be used in the practice of the present invention.

FIG. 5 is a schematic diagram of a mobile station (MS)/base station (BS) 110 which may be used in the practice of the present invention. It includes one or more processors 120, and one or more memories 125 including computer program code 123. In addition, MS/BS 110 includes one or more antennas 128 and transceiver 130.

In WiMAX there are defined different types of basic network architectures and the detailed solutions in the different cases will be described in the following.

According to a centralized ASN (access service network) architecture, there is a centralized radio resource controller (RRC) element in the ASN, which collects the information from all radio resource agents (RRA) and decides about all or most RRM (radio resource management) related issues, like e.g. handovers. In this case, the ASN must store the identification of the previous serving base station, the criteria that was used for the handover decision and the time when the handover took place.

According to a distributed ASN architecture, each base station may have it's own RRC function. In this case, the RRC of the serving base station must store the identification of the target base station, the criteria that was used for the handover decision, and the time when the handover took place. Further, the RRC of the serving base station must initiate a timer after which the history information and the tightened handover criteria can be ignored.

In case of a mobile station based solution, when the mobile station initiates the handover, it also knows the reason and the metrics for the handover request. Thus, it can store then and utilize them in the same way as in the aforementioned base station based solution. However, if the handover is network initiated, the mobile station will not know the reason for the handover. In this case the mobile station can store only the identification of the base station at the current time.

Also in the WiMAX system there are two types of behaviour. In the first case, there is one handover from the first base station to the second base station and the handover back to the first base station is prevented before it takes place. This case is possible when the handover control function is aware of the reason for the first handover. That is, it is always possible with centralized ASN architecture. In the case of distributed ASN architecture, the second base station needs to know the identification of the first base station (optional in the messages at the time of the first handover) and the reason for the first handover (DL PHY quality info, i.e. RSSI and C/O mean and standard deviation may be available).

In the second case, the handover is done back and forth once without any special actions being done about it. This is valid in case of a distributed ASN architecture when the second base station does not have PHY quality information of the first base station available. Then, the handover is done back to the first base station which has the information about the criteria used for the first handover. Thus, the first base station can take actions to prevent further unnecessary handovers.

In the above described examples, handovers between only two base station have been described. However, it is to be noted that the above mentioned solutions also provide a prevention of unnecessary handovers between three or more base stations. That is because the timer does not care how many base stations the mobile station has visited after the last connection to the base station in question.

Further, the timer values can be adjustable for temporary extension of the timer period.

Moreover, if the handover target base station does not know the reason for the handover (when the metrics are optional in the handover messages) it may ask the mobile station to provide the input metrics for all involved base stations.

In view of the foregoing description it will be evident to a person skilled in the art that various modifications may be made within the scope of the invention.

For the purpose of the present invention to be described herein above, it should be noted that a mobile station may for example be any kind of a wireless communication device, e.g. personal computers, mobile phones or the like, irrespective of a specific standard to which these conform as long as they are compatible with the communication system;

method steps likely to be implemented as software code portions and being run using a processor at one of the devices, e.g. mobile station or network element, are software code independent and can be specified using any known or future developed programming language as long as the functionality defined by the method steps is preserved;

generally, any method step is suitable to be implemented as software or by hardware without changing the idea of the present invention in terms of the functionality implemented;

method steps and/or devices likely to be implemented as hardware components at one of the devices, e.g. network element or mobile station are hardware independent and can be implemented using any known or future developed hardware technology or any hybrids of these, such as MOS (Metal Oxide Semiconductor), CMOS (Complementary MOS), BiCMOS (Bipolar CMOS), ECL (Emitter Coupled Logic), TTL (Transistor Transistor Logic), etc., using for example ASIC (Application Specific Integrated Circuit) components or DSP (Digital Signal Processor) components, as an example;

devices can be implemented as individual devices, but this does not exclude that they are implemented in a distributed fashion throughout the system, as long as the functionality of the device/system is preserved respective elements, e.g. deciding unit, comparing unit, etc. according to certain embodiments can be implemented by any known means, either in hardware (DSP, microprocessor, microcontroller, ASIC, FPGA, etc) and/or software, respectively, as long as it is adapted to perform the described functions of the respective parts.

The invention claimed is:

1. A method comprising:
   comparing, when a handover of a mobile station to a base station is intended, decision criteria of the intended handover with decision criteria of previous handovers of the mobile station to that base station; and
   allowing the intended handover based on the result of the comparison indicates that the intended handover would not be a ping-pong handover and preventing the intended handover when the comparison indicates that the intended handover would be a ping-pong handover.

2. The method according to claim 1, further comprising:
   comparing a time interval from an end of a last attachment of the mobile station to the base station to an actual time point of the intended handover, with a predetermined time interval; and
   deciding on carrying out the comparison of the decision criteria based on the result of the comparison of the time intervals.

3. The method according to claim 1, further comprising:
   storing identifications of at least one base station to which the mobile station had previously been attached;
   storing a time interval from an end of the last attachment of the mobile station to the at least one base station whose identification is stored, for each of the at least one base stations;
   storing decision criteria for a handover of the mobile station to the at least one base station, for each of the at least one base stations;
   determining an identification of a base station, to which a handover is intended, and decision criteria of the intended handover;
   comparing the identification of the base station, to which a handover is intended, and the stored identifications, and
   deciding whether to allow or to prevent the handover based on a result of the comparison of the time interval and the identification.

4. The method according to claim 1, further comprising:
   when the identification of the base station, to which a handover is intended, is not stored, allowing the intended handover.

5. The method according to claim 1, further comprising:
   when the identification of the base station, to which a handover is intended, is stored, and when the time interval has expired, allowing the intended handover.

6. The method according to claim 1, further comprising:
   when the identification of the base station, to which a handover is intended, is stored, when the time interval has not expired, and when the decision criteria for the intended handover are not stored, allowing the intended handover.

7. The method according to claim 1, further comprising:
   when the identification of the base station, to which a handover is intended, is stored, when the time interval has not expired, and when the decision criteria for the intended handover are stored, comparing the decision criteria for the intended handover with a predetermined threshold value.

8. The method according to claim 1, comprising:
   storing identifications of at least one mobile station which had previously been attached to the base station;
   storing a timer interval from an end of a last attachment of the at least one mobile station, whose identification is stored, to the base station, for each of the at least one mobile stations;
   storing decision criteria for a handover of the at least one mobile station, for each of the at least one mobile stations;
   determining an identification of a mobile station for which a handover to the base station is intended, and decision criteria of the intended handover;
   comparing the identification of the mobile station for which the handover to the base station is intended and the identifications stored, and
   deciding whether to allow or to prevent the intended handover based on a result of the comparison of the time interval and the identification.

9. The method according to claim 1, further comprising:
   when the identification of the mobile station for which the handover to the base station is intended is not stored, allowing the intended handover.

10. The method according to claim 1, further comprising:
    when the identification of the mobile station for which the handover to the base station is intended is stored, and when the time interval has expired, allowing the intended handover.

11. The method according to claim 1, further comprising:
    when the identification of the mobile station for which the handover to the base station is intended is stored, when the time interval has not expired, and when the decision criteria for the intended handover are not stored, allowing the intended handover.

12. The method according to claim 1, further comprising:
    when the identification of the mobile station for which the handover to the base station is intended is stored, when the time interval has not expired, and when the decision criteria for the intended handover are stored, comparing the decision criteria for the intended handover with a predetermined threshold value.

13. The method according to claim 1, further comprising:
    when the decision criteria for the intended handover exceed the predetermined threshold value, allowing the intended handover.

14. The method according to claim 1, further comprising:
    when the decision criteria for the intended handover do not exceed the predetermined threshold value, preventing the intended handover.

15. A device comprising:
    one or more processors;
    and one or more memories including computer program code, the one or more memories and the computer program code configured, with the one or more processors, to cause the device to perform at least the following:
    comparing, when a handover of a mobile station to a base station is intended, decision criteria of the intended handover with decision criteria of previous handovers of the mobile station to that base station; and
    allowing the intended handover based on the result of the comparison indicates that the intended handover would not be a ping-pong handover and preventing the intended handover when the comparison indicates that the intended handover would be a ping-pong handover.

16. The device according to claim 15, wherein the one or more memories and the computer program code are configured, with the one or more processors, to cause the device to further perform:
    comparing time interval from an end of a last attachment of the mobile station to the base station to an actual time point of the intended handover, with a predetermined time interval; and deciding on carrying out the comparison of the decision criteria based on the result of the comparison of the time intervals.

17. The device according to claim 15, wherein the one or more memories and the computer program code are configured, with the one or more processors, to cause the device to further perform:
storing identifications of at least one base station to which the mobile station had previously been attached;
storing a time interval from an end of the last attachment of the mobile station to the at least one base station whose identification is stored, for each of the at least one base stations;
storing decision criteria for a handover of the mobile station to the at least one base station, for each of the at least one base stations;
determining an identification of a base station, to which a handover is intended, and decision criteria of the intended handover;
comparing the identification of the base station, to which a handover is intended, and the identifications stored, and
deciding whether to allow or to prevent the handover based on a result of the comparison of the time interval and the identification.

18. The device according to claim 15, wherein the one or more memories and the computer program code are configured, with the one or more processors, to cause the device to further perform:
when the identification of the base station, to which a handover is intended, is not stored, deciding to allow the intended handover.

19. The device according to claim 15, wherein the one or more memories and the computer program code are configured, with the one or more processors, to cause the device to further perform:
when the identification of the base station, to which a handover is intended, is stored, and when the time interval has expired, deciding to allow the intended handover.

20. The device according to claim 15, wherein the one or more memories and the computer program code are configured, with the one or more processors, to cause the device to further perform:
when the identification of the base station, to which a handover is intended, is stored, when the time interval has not expired, and when the decision criteria for the intended handover are not stored, deciding to allow the intended handover.

21. The device according to claim 15, wherein the one or more memories and the computer program code are configured, with the one or more processors, to cause the device to further perform:
when the identification of the base station, to which a handover is intended, is stored, when the time interval has not expired, and when the decision criteria for the intended handover are stored, comparing the decision criteria for the intended handover with a predetermined threshold value.

22. The device according to claim 15, wherein the one or more memories and the computer program code are configured, with the one or more processors, to cause the device to further perform:
storing identifications of at least one mobile station which had previously been attached to the base station;
storing a timer interval from an end of a last attachment of the at least one mobile station, whose identification is stored, to the base station, for each of the at least one mobile stations;
storing decision criteria for a handover of the at least one mobile station, for each of the at least one mobile stations;
determining an identification of a mobile station for which a handover to the base station is intended, and decision criteria of the intended handover;
comparing the identification of the mobile station for which the handover to the base station is intended and the identifications stored, and
deciding whether to allow or to prevent the intended handover based on a result of the comparison of the time interval and the identification.

23. The device according to claim 15, wherein the one or more memories and the computer program code are configured, with the one or more processors, to cause the device to further perform:
when the identification of the mobile station for which the handover to the base station is intended is not stored, deciding to allow the intended handover.

24. The device according to claim 15, wherein the one or more memories and the computer program code are configured, with the one or more processors, to cause the device to further perform:
when the identification of the mobile station for which the handover to the base station is intended is stored, and when the time interval has expired, deciding to allow the intended handover.

25. The device according to claim 15, wherein the one or more memories and the computer program code are configured, with the one or more processors, to cause the device to further perform:
when the identification of the mobile station for which the handover to the base station is intended is stored, when the time interval has not expired, and when the decision criteria for the intended handover are not stored, deciding to allow the intended handover.

26. The device according to claim 15, wherein the one or more memories and the computer program code are configured, with the one or more processors, to cause the device to further perform:
when the identification of the mobile station for which the handover to the base station is intended is stored, when the time interval has not expired, and when the decision criteria for the intended handover are stored, comparing the decision criteria for the intended handover with a predetermined threshold value.

27. The device according to claim 15, wherein the one or more memories and the computer program code are configured, with the one or more processors, to cause the device to further perform:
when the decision criteria for the intended handover exceed the predetermined threshold value, deciding to allow the intended handover.

28. The device according to claim 15, wherein the one or more memories and the computer program code are configured, with the one or more processors, to cause the device to further perform:
when the decision criteria for the intended handover do not exceed the predetermined threshold value, deciding to prevent the intended handover.

29. The device according to claim 15, the device being a mobile station or a network element of a mobile communication network.

30. A system comprising the device according to claim 15.

31. A computer program product embodied on a non-transitory, computer-readable storage medium including a program comprising software code portions for performing, when the program is run on a processing device, any of the steps of the method according to claim 1.

* * * * *